United States Patent
He et al.

(10) Patent No.: US 9,959,410 B2
(45) Date of Patent: May 1, 2018

(54) ENCRYPTION AND DECRYPTION METHOD AND APPARATUS IN VIRTUALIZATION SYSTEM, AND SYSTEM

(71) Applicant: HUAWEI TECHNOLOGIES CO.,LTD., Shenzhen, Guangdong (CN)

(72) Inventors: Wei He, Beijing (CN); Hongzhong Wu, Shenzhen (CN); Zhipeng Yang, Beijing (CN); Weifeng Ren, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/637,091

(22) Filed: Jun. 29, 2017

(65) Prior Publication Data
US 2017/0300695 A1    Oct. 19, 2017

Related U.S. Application Data

(63) Continuation of application No. PCT/CN2014/095598, filed on Dec. 30, 2014.

(51) Int. Cl.
*G06F 15/173* (2006.01)
*G06F 21/57* (2013.01)
(Continued)

(52) U.S. Cl.
CPC .......... *G06F 21/57* (2013.01); *G06F 9/45533* (2013.01); *G06F 9/45558* (2013.01);
(Continued)

(58) Field of Classification Search
CPC ...... G06F 12/1408; G06F 21/57; G06F 21/62; G06F 21/6236; H04L 29/06;
(Continued)

(56) References Cited

U.S. PATENT DOCUMENTS 8,495,356 B2     7/2013  Ashok et al.
2010/0153749 A1*  6/2010  Sakai ..................... G06F 21/57
                                                     713/193

(Continued)

FOREIGN PATENT DOCUMENTS

CN    101587524 A    11/2009
CN    101976317 A     2/2011
(Continued)

OTHER PUBLICATIONS

Product manual of Network Guardian VPN system SJW11 network password machine,TOPSEC,2009,with an English translation,total 25 pages.

*Primary Examiner* — Frantz Jean
(74) *Attorney, Agent, or Firm* — Huawei Technologies Co., Ltd.

(57) ABSTRACT

An encryption and decryption method in a virtualization system is disclosed. The virtualization system includes a VMM and an encryption and decryption virtual machine. The VMM includes a control module, the encryption and decryption virtual machine records a first association relationship between a hard disk image identifier and a key, the key includes an encryption key, and the virtualization system records a second association relationship between the hard disk image identifier and a hard disk image attribute. The control module in the VMM is configured to determine whether to-be-written data needs to be encrypted and forward the to-be-written data, which makes it easy to implement a function and reduces system complexity of the VMM. In addition, encryption or decryption is processed without occupying a resource in the VMM.

8 Claims, 7 Drawing Sheets

(51) Int. Cl.
 H04L 29/06 (2006.01)
 G06F 9/455 (2018.01)
 G06F 21/62 (2013.01)
 H04L 12/24 (2006.01)

(52) U.S. Cl.
 CPC .......... *G06F 21/62* (2013.01); *G06F 21/6218* (2013.01); *H04L 29/06* (2013.01); *H04L 41/0803* (2013.01); *H04L 63/08* (2013.01); *G06F 2009/45562* (2013.01); *G06F 2009/45575* (2013.01); *G06F 2009/45587* (2013.01)

(58) Field of Classification Search
 CPC ... H04L 41/0808; H04L 63/08; H04L 63/061; H04L 9/14; H04L 9/00
 USPC ........................ 713/189; 718/1; 709/203, 223
 See application file for complete search history.

(56) References Cited

U.S. PATENT DOCUMENTS

| | | | |
|---|---|---|---|
| 2011/0246786 A1* | 10/2011 | Laor | G06F 9/45533 713/189 |
| 2011/0296440 A1* | 12/2011 | Laurich | G06F 21/602 719/326 |
| 2012/0204030 A1 | 8/2012 | Nossik et al. | |
| 2012/0297206 A1 | 11/2012 | Nord et al. | |
| 2013/0263114 A1* | 10/2013 | Watkins | G06F 9/45558 718/1 |
| 2014/0164792 A1* | 6/2014 | Nord | G06F 21/602 713/193 |
| 2015/0381589 A1* | 12/2015 | Tarasuk-Levin | H04L 63/0428 713/193 |
| 2016/0006564 A1* | 1/2016 | Glider | H04L 9/0894 380/28 |

FOREIGN PATENT DOCUMENTS

| | | |
|---|---|---|
| CN | 102034046 A | 4/2011 |
| CN | 102609643 A | 7/2012 |
| CN | 103067425 A | 4/2013 |
| CN | 103107994 A | 5/2013 |
| CN | 103457919 A | 12/2013 |
| CN | 103563278 A | 2/2014 |
| CN | 103634339 A | 3/2014 |
| CN | 104104692 A | 10/2014 |
| WO | 2014057369 A1 | 4/2014 |

* cited by examiner

An encryption and decryption virtual machine receives a virtual machine create indication message sent by a virtual machine management module, where the virtual machine create indication message carries an identifier of a to-be-created user virtual machine, a hard disk image identifier allocated to the created user virtual machine, and a hard disk image attribute corresponding to the allocated hard disk image identifier, and the virtual machine create indication message is specifically sent after the virtual machine management module creates the user virtual machine and a hard disk image according to a virtual machine create request sent by a system management module ⸺ 601

The encryption and decryption virtual machine allocates a key to the created hard disk image, and establishes a first association relationship between the identifier of the created user virtual machine, the allocated hard disk image identifier, and the key ⸺ 602

The encryption and decryption virtual machine sends a virtual machine create response message to the system management module, where the virtual machine create response message includes the identifier of the created virtual machine ⸺ 603

FIG. 6

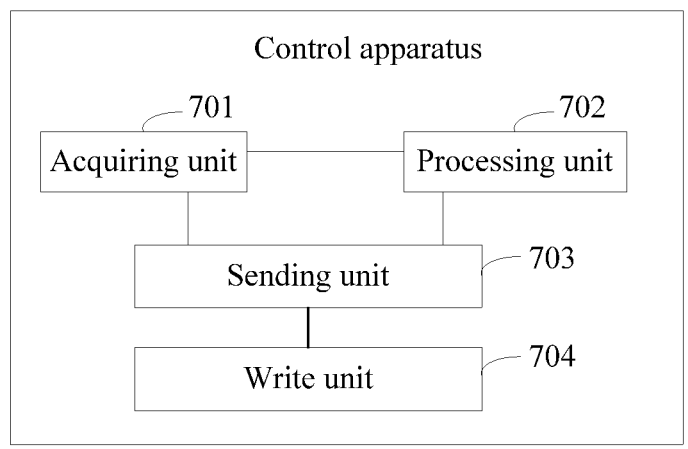

FIG. 7

ENCRYPTION AND DECRYPTION METHOD AND APPARATUS IN VIRTUALIZATION SYSTEM, AND SYSTEM

CROSS-REFERENCE TO RELATED APPLICATIONS

This application is a continuation of International Application No. PCT/CN2014/095598, filed on Dec. 30, 2014, the disclosure of which is hereby incorporated by reference in its entirety.

TECHNICAL FIELD

The present invention relates to the computing field, and in particular, to an encryption and decryption method and apparatus in a virtualization system, and a system.

BACKGROUND

A cloud computing platform may effectively provide massive computing resources for a user in a form of a virtual machine (VM) by effectively integrating various interconnected computing resources and implementing multi-level virtualization and abstraction. Specifically, virtualization software deployed in a cloud computing host constitutes an environment in which the virtual machine runs, and provides services such as a network and storage for the virtual machine. User data is stored in a virtual hard disk of the virtual machine, an actual physical storage space of the virtual hard disk is in a hard disk array of a storage server, and the storage server organizes storage space of the virtual hard disk into a large file or a large data block, where the large file or the large data block is referred to as a hard disk image. The hard disk image is a storage entity of data in the virtual machine and indicates a storage state in which content of a disk or a hard disk of the virtual machine is organized in a unit of sector. The cloud computing platform needs to provide a reliable security assurance technology, so as to ensure security of user data in the hard disk image and avoid disclosure of user private data that includes a business secret.

As shown in FIG. 1, FIG. 1 is a schematic structural diagram for implementing an encryption and decryption technology in a prior-art virtualization system. To ensure security of user data, a device mapping and encrypting module is included in a virtual machine monitor (VMM) and is configured to map a hard disk image as a virtual block device. The hard disk image is invisible to a user virtual machine, virtualization software connects the block device to the user virtual machine, and the device mapping and encrypting module may perceive access to the block device by the user virtual machine and perform encryption processing on accessed data in the hard disk image, thereby implementing protection for the user data. However, hundreds of hard disk images may exist in a cloud computing host. These hard disk images include many types, for example, a large file, a local block device, and a network block device. Some hard disk images need to be encrypted, and some do not need to be encrypted. Therefore, the device mapping and encrypting module needs to separately perform identification and processing, which results in complicated implementation of the device mapping and encrypting module and brings a great impact on stability of a cloud computing operating system.

SUMMARY

An objective of the present invention is to provide an encryption and decryption method and apparatus in a virtualization system, and a system, so as to resolve a problem in the prior art of complicated implementation and system instability that are brought by performing encryption or decryption processing by a device mapping and encrypting module in a VMM.

According to a first aspect, an embodiment of the present invention provides a virtualization system, including a virtual machine monitor VMM and an encryption and decryption virtual machine, where the VMM includes a control module, the encryption and decryption virtual machine records a first association relationship between a hard disk image identifier and a key, the key includes an encryption key, and the virtualization system records a second association relationship between the hard disk image identifier and a hard disk image attribute;

the control module is configured to: acquire to-be-written data of a user virtual machine, determine, according to the second association relationship, a hard disk image attribute of a hard disk image that is of the user virtual machine and into which the data is to be written, and if the determined hard disk image attribute is encryption, send an identifier of the hard disk image into which the data is to be written and the to-be-written data to the encryption and decryption virtual machine;

the encryption and decryption virtual machine is configured to: determine, according to the first association relationship, an encryption key corresponding to the identifier of the hard disk image into which the data is to be written, encrypt the to-be-written data by using the encryption key to obtain encrypted data, and send the encrypted data to the control module; and the control module is further configured to write the encrypted data into the hard disk image into which the data is to be written.

With reference to the first aspect, in a first possible implementation manner of the first aspect, the first association relationship further includes an identifier of the user virtual machine;

the control module is specifically configured to send the identifier of the user virtual machine, the identifier of the hard disk image into which the data is to be written, and the to-be-written data to the encryption and decryption virtual machine; and the encryption and decryption virtual machine is specifically configured to: acquire the identifier of the user virtual machine and the identifier of the hard disk image into which the data is to be written, determine whether the first association relationship includes a correspondence between the identifier of the user virtual machine and the identifier of the hard disk image into which the data is to be written, and if no, return an encryption failure indication to the control module, or if yes, encrypt the to-be-written data by using the determined encryption key corresponding to the identifier of the hard disk image into which the data is to be written.

With reference to the first possible implementation manner of the first aspect, in a second possible implementation manner of the first aspect, the key further includes a decryption key;

the control module is further configured to: acquire a read request triggered by the user virtual machine, read data from a hard disk image from which the data is to be read, determine that the read data is encrypted data, and send a decryption request to the encryption and decryption virtual machine, where the decryption request carries the identifier of the user virtual machine, the read encrypted data, and an identifier of the hard disk image;

the encryption and decryption virtual machine is further configured to: receive the decryption request, determine whether the first association relationship includes a correspondence between the identifier of the hard disk image and the identifier of the user virtual machine that sends the read request, and if yes, acquire, from the first association relationship, a decryption key corresponding to the identifier of the hard disk image, decrypt the read encrypted data by using the decryption key, and send obtained decrypted data to the control module; and the control module is further configured to return the decrypted data to the user virtual machine.

With reference to the second possible implementation manner of the first aspect, in a third possible implementation manner of the first aspect, the control module is further configured to: when it is determined that the read data is non-encrypted data, return the read non-encrypted data to the user virtual machine.

With reference to any one of the first to the third possible implementation manners of the first aspect, in a fourth possible implementation manner of the first aspect, the system further includes a system management module and a virtual machine management module;

the system management module is configured to send a virtual machine start request to the virtual machine management module, where the virtual machine start request carries an identifier of a to-be-started user virtual machine;

the virtual machine management module is configured to: receive the virtual machine start request, start the to-be-started user virtual machine according to the virtual machine start request, and send a hard disk image identifier and a hard disk image attribute that are of the started user virtual machine to the control module; and the control module is further configured to: receive and record the hard disk image identifier and the hard disk image attribute that are of the started user virtual machine, and establish the second association relationship.

With reference to any one of the first to the fourth possible implementation manners of the first aspect, in a fifth possible implementation manner of the first aspect, the system further includes the system management module and the virtual machine management module;

the system management module is further configured to send a virtual machine create request to the virtual machine management module, where the virtual machine create request carries a hard disk image attribute of a to-be-created user virtual machine;

the virtual machine management module is further configured to: receive the virtual machine create request, create a user virtual machine, create a hard disk image for the created user virtual machine, allocate a hard disk image identifier, determine, according to the virtual machine create request, a hard disk image attribute corresponding to the allocated hard disk image identifier, and send a virtual machine create indication message to the encryption and decryption virtual machine, where the virtual machine create indication message carries an identifier of the created user virtual machine, the allocated hard disk image identifier, and the hard disk image attribute corresponding to the allocated hard disk image identifier; and the encryption and decryption virtual machine is further configured to: receive the virtual machine create indication message, allocate a key to the created hard disk image, and establish the first association relationship between the identifier of the created user virtual machine, the allocated hard disk image identifier, and the key.

With reference to the fifth possible implementation manner of the first aspect, in a sixth possible implementation manner of the first aspect, the encryption and decryption virtual machine is further configured to send a virtual machine create response message to the system management module, where the virtual machine create response message includes the identifier of the created user virtual machine.

With reference to the fifth possible implementation manner of the first aspect, in a seventh possible implementation manner of the first aspect, the system management module is further configured to send a hard disk image add request message to the virtual machine management module, where the hard disk image add request message carries the identifier of the user virtual machine and an attribute of a newly-added hard disk image;

the virtual machine management module is further configured to: receive the hard disk image add request message, create a new hard disk image for the user virtual machine, determine a hard disk image attribute of the new hard disk image according to the hard disk image add request message, and send the identifier of the user virtual machine, an identifier of the new hard disk image, and the hard disk image attribute of the new hard disk image to the encryption and decryption virtual machine; and the encryption and decryption virtual machine is further configured to allocate a key to the new hard disk image and update the first association relationship.

With reference to the first aspect, in an eighth possible implementation manner of the first aspect, the control module is specifically configured to acquire, from a device driver, a write request triggered by the user virtual machine, where the write request carries the to-be-written data.

With reference to the first aspect, in a ninth possible implementation manner of the first aspect, the key further includes a decryption key, the control module is further configured to: acquire a read request triggered by the user virtual machine, read data from a hard disk image from which the data is to be read, determine that the read data is encrypted data, and send a decryption request to the encryption and decryption virtual machine, where the decryption request carries the identifier of the user virtual machine, the read encrypted data, and an identifier of the hard disk image;

the encryption and decryption virtual machine is further configured to: receive the decryption request, determine, according to the first association relationship, a decryption key corresponding to the identifier of the hard disk image, decrypt the to-be-written data by using the decryption key, and send obtained decrypted data to the control module; and the control module is further configured to return the decrypted data to the user virtual machine.

With reference to the first aspect or the ninth possible implementation manner of the first aspect, in a tenth possible implementation manner of the first aspect, the system further includes a system management module and a virtual machine management module;

the system management module is configured to send a virtual machine start request to the virtual machine management module, where the virtual machine start request carries an identifier of a to-be-started user virtual machine;

the virtual machine management module is configured to: receive the virtual machine start request, start the to-be-started user virtual machine according to the virtual machine start request, and send a hard disk image identifier and a hard disk image attribute that are of the started user virtual machine to the control module; and the control module is further configured to: receive and record the hard disk image identifier and the hard disk image attribute that are of the started user virtual machine, and establish the second association relationship.

With reference to the first aspect, the ninth possible implementation manner of the first aspect, or the tenth possible implementation manner of the first aspect, in an eleventh possible implementation manner of the first aspect, the system further includes the system management module and the virtual machine management module;

the system management module is further configured to send a virtual machine create request to the virtual machine management module, where the virtual machine create request carries a hard disk image attribute of a to-be-created user virtual machine;

the virtual machine management module is further configured to: receive the virtual machine create request, create a user virtual machine, create a hard disk image for the created user virtual machine, allocate a hard disk image identifier, determine, according to the virtual machine create request, a hard disk image attribute corresponding to the allocated hard disk image identifier, and send a virtual machine create indication message to the encryption and decryption virtual machine, where the virtual machine create indication message carries the allocated hard disk image identifier, and the hard disk image attribute corresponding to the allocated hard disk image identifier; and the encryption and decryption virtual machine is further configured to: receive the virtual machine create indication message, allocate a key to the hard disk image, and establish the first association relationship between the hard disk image identifier and the key.

With reference to the eleventh possible implementation manner of the first aspect, in a twelfth possible implementation manner of the first aspect, the system management module is further configured to send a hard disk image add request message to the virtual machine management module, where the hard disk image add request message carries the identifier of the user virtual machine and an attribute of a newly-added hard disk image;

the virtual machine management module is further configured to: receive the hard disk image add request message, create a new hard disk image for the user virtual machine, determine a hard disk image attribute of the new hard disk image, and send an identifier of the new hard disk image and the hard disk image attribute of the new hard disk image to the encryption and decryption virtual machine; and the encryption and decryption virtual machine is further configured to allocate a key to the new hard disk image and update the first association relationship.

According to a second aspect, an embodiment of the present invention provides an encryption and decryption method in a virtualization system, where the method is applied to the virtualization system, the virtualization system includes a virtual machine monitor VMM and an encryption and decryption virtual machine, the VMM includes a control module, the encryption and decryption virtual machine records a first association relationship between a hard disk image identifier and a key, the key includes an encryption key, the virtualization system records a second association relationship between the hard disk image identifier and a hard disk image attribute, and the method includes:

acquiring, by the control module, to-be-written data of a user virtual machine, determining, according to the second association relationship, a hard disk image attribute of a hard disk image that is of the user virtual machine and into which the data is to be written, and if the determined hard disk image attribute is encryption, sending an identifier of the hard disk image into which the data is to be written and the to-be-written data to the encryption and decryption virtual machine;

receiving, by the control module, encrypted data obtained after the encryption and decryption virtual machine encrypts the to-be-written data by using the encryption key, where the encryption key is an encryption key that is determined by the encryption and decryption virtual machine according to the first association relationship and that is corresponding to the identifier of the hard disk image into which the data is to be written; and writing, by the control module, the encrypted data into the hard disk image into which the data is to be written.

With reference to the second aspect, in the first possible implementation manner of the second aspect, the first association relationship further includes an identifier of the user virtual machine, the key further includes a decryption key, and the method further includes:

acquiring, by the control module, a read request triggered by the user virtual machine, reading data from a hard disk image from which the data is to be read, determining that the read data is encrypted data, and sending a decryption request to the encryption and decryption virtual machine, where the decryption request carries the identifier of the user virtual machine, the read encrypted data, and an identifier of the hard disk image;

receiving, by the control module, decrypted data that is returned by the encryption and decryption virtual machine, where after determining that the first association relationship includes a correspondence between the identifier of the user virtual machine and the identifier of the hard disk image, the encryption and decryption virtual machine obtains the decrypted data by decrypting the encrypted data by using a decryption key that is determined according to the first association relationship and that is corresponding to the identifier of the hard disk image; and returning, by the control module, the decrypted data to the user virtual machine.

With reference to the first possible implementation manner of the second aspect, in a second possible implementation manner of the second aspect, when it is determined that the read data is non-encrypted data, returning, by the control module, the read non-encrypted data to the user virtual machine.

With reference to the second aspect, in a third possible implementation manner of the second aspect, the system further includes a virtual machine management module, and the method further includes:

receiving, by the control module, a virtual machine start indication message sent by the virtual machine management module, where the virtual machine start indication message carries an identifier of a started user virtual machine, and a hard disk image identifier and a hard disk image attribute that are of the started user virtual machine; and recording, by the control module, the hard disk image identifier and the hard disk image attribute that are of the started user virtual machine, and updating the second association relationship.

With reference to the second aspect, in a fourth possible implementation manner of the second aspect, the acquiring, by the control module, to-be-written data of a user virtual machine includes:

acquiring, by the control module from a device driver, a write request triggered by the user virtual machine, where the write request carries the to-be-written data.

According to a third aspect, an embodiment of the present invention provides of a user virtual machine create method, where the method is applied to a virtualization system, the virtualization system includes a VMM, a system management module, and an encryption and decryption virtual machine, the VMM includes a virtual machine management module, and the method includes:

receiving, by the encryption and decryption virtual machine, a virtual machine create indication message sent by the virtual machine management module, where the virtual machine create indication message carries an identifier of a created user virtual machine, an identifier of a hard disk image allocated to the created user virtual machine, and a hard disk image attribute corresponding to the allocated hard disk image identifier, and the virtual machine create indication message is specifically sent after the virtual machine management module creates the user virtual machine and a hard disk image according to a virtual machine create request sent by the system management module;

allocating, by the encryption and decryption virtual machine, a key to the created hard disk image, and establishing a first association relationship between the identifier of the created user virtual machine, the allocated hard disk image identifier, and the key; and sending, by the encryption and decryption virtual machine, a virtual machine create response message to the system management module, where the virtual machine create response message includes the identifier of the created user virtual machine.

With reference to the third aspect, in a first possible implementation manner of the third aspect, the method further includes:

receiving, by the encryption and decryption virtual machine, a hard disk image add indication message sent by the virtual machine management module, where the hard disk image add indication message carries the identifier of the user virtual machine, and an identifier and a hard disk image attribute that are of a hard disk image added by the virtual machine management module for the user virtual machine, and the hard disk image add indication message is specifically sent after the virtual machine management module creates the newly-added hard disk image for the user virtual machine according to a hard disk image add request sent by the system management module; and allocating, by the encryption and decryption virtual machine, a key to the newly-added hard disk image, and updating, to the first association relationship, the identifier of the user virtual machine, the identifier of the newly-added hard disk image, and the key allocated to the newly-added hard disk image.

With reference to the third aspect, in a second possible implementation manner of the third aspect, the VMM includes a control module, and the method further includes:

receiving, by the encryption and decryption virtual machine, an encryption request sent by the control module, where the encryption request carries the identifier of the user virtual machine, an identifier of a hard disk image into which data is to be written, and to-be-written data, determining whether the first association relationship includes a correspondence between the identifier of the user virtual machine and the identifier of the hard disk image into which the data is to be written, and if no, returning an encryption failure indication to the control module, or if yes, determining, according to the first association relationship, an encryption key corresponding to the identifier of the hard disk image into which the data is to be written, encrypting the to-be-written data by using the encryption key to obtain encrypted data, and sending the encrypted data to the control module, so that the control module writes the encrypted data into the hard disk image into which the data is to be written.

With reference to the second possible implementation manner of the third aspect, in a third possible implementation manner of the third aspect, the method further includes:

receiving, by the encryption and decryption virtual machine, a decryption request sent by the control module, where the decryption request carries the identifier of the user virtual machine, the encrypted data that is read, and the identifier of the hard disk image, determining whether the first association relationship includes a correspondence between the identifier of the user virtual machine and the identifier of the hard disk image, and if yes, acquiring, from the first association relationship, a decryption key corresponding to the identifier of the hard disk image, decrypting the read encrypted data by using the decryption key, and sending obtained decrypted data to the control module, so that the control module returns the decrypted data to the user virtual machine.

According to a fourth aspect, an embodiment of the present invention provides a control apparatus in a virtualization system, where the control apparatus is located in a VMM of the virtualization system, the virtualization system further includes an encryption and decryption virtual machine, the encryption and decryption virtual machine records a first association relationship between a hard disk image identifier and a key, the key includes an encryption key, the virtualization system records a second association relationship between the hard disk image identifier and a hard disk image attribute, and the control apparatus includes:

an acquiring unit, configured to acquire to-be-written data of a user virtual machine;

a processing unit, configured to determine, according to the second association relationship, a hard disk image attribute of a hard disk image that is of the user virtual machine and into which the data is to be written;

a sending unit, configured to: when the hard disk image attribute determined by the processing unit is encryption, send an identifier of the hard disk image into which the data is to be written and the to-be-written data to the encryption and decryption virtual machine; where the acquiring unit is further configured to receive encrypted data obtained after the encryption and decryption virtual machine encrypts the to-be-written data by using the encryption key, where the encryption key is an encryption key that is determined by the encryption and decryption virtual machine according to the first association relationship and that is corresponding to the identifier of the hard disk image into which the data is to be written; and a write unit, configured to write the encrypted data received by the acquiring unit into the hard disk image into which the data is to be written.

With reference to the fourth aspect, in a first possible implementation manner of the fourth aspect, the key further includes a decryption key, the acquiring unit is further configured to acquire a read request triggered by the user virtual machine;

the processing unit is further configured to read data from a hard disk image from which data is to be read, and determine that the read data is encrypted data;

the sending unit is further configured to: when the processing unit determines that the read data is the encrypted data, send a decryption request to the encryption and decryption virtual machine, where the decryption request carries the identifier of the user virtual machine, the read encrypted data, and an identifier of the hard disk image;

the acquiring unit is further configured to receive decrypted data that is returned by the encryption and decryption virtual machine, where after determining that the first association relationship includes a correspondence between the identifier of the user virtual machine and the identifier of the hard disk image, the encryption and decryption virtual machine obtains the decrypted data by decrypting the encrypted data by using a decryption key that is determined according to the first association relationship and that is corresponding to the identifier of the hard disk image; and the sending module is further configured to return the decrypted data received by the acquiring unit to the user virtual machine.

With reference to the first possible implementation manner of the fourth aspect, in a second possible implementation manner of the fourth aspect, the sending unit is further configured to: when the processing unit determines that the read data is non-encrypted data, return the read non-encrypted data to the user virtual machine.

With reference to the fourth aspect, in a third possible implementation manner of the fourth aspect, the acquiring unit is further configured to receive a virtual machine start indication message sent by a virtual machine management module, where the virtual machine start indication message carries an identifier of a started user virtual machine, and a hard disk image identifier and a hard disk image attribute that are of the started user virtual machine; and the processing unit is further configured to record the hard disk image identifier and the hard disk image attribute that are of the started user virtual machine, and update the second association relationship.

With reference to the fourth aspect, in a fourth possible implementation manner of the fourth aspect, the acquiring unit is specifically configured to acquire, from a device driver, a write request triggered by the user virtual machine, where the write request carries the to-be-written data.

According to a fifth aspect, an embodiment of the present invention provides an encryption and decryption apparatus in a virtualization system, where the encryption and decryption apparatus is applied to the virtualization system, the virtualization system includes the encryption and decryption apparatus, a VMM, and a system management module, the VMM includes a virtual machine management module, and the encryption and decryption apparatus includes:

a receiving unit, configured to receive a virtual machine create indication message sent by the virtual machine management module, where the virtual machine create indication message carries an identifier of a created user virtual machine, an identifier of a hard disk image allocated to the created user virtual machine, and a hard disk image attribute corresponding to the allocated hard disk image identifier, and the virtual machine create indication message is specifically sent after the virtual machine management module creates the user virtual machine and a hard disk image according to a virtual machine create request sent by the system management module;

an execution unit, configured to: after the receiving unit receives the virtual machine create indication message, allocate a key to the created hard disk image, and establish a first association relationship between the identifier of the created user virtual machine, the allocated hard disk image identifier, and the key; and a message returning unit, configured to send a virtual machine create response message to the system management module, where the virtual machine create response message includes the identifier of the created user virtual machine.

With reference to the fifth aspect, in a first possible implementation manner of the fifth aspect, the receiving unit is further configured to receive a hard disk image add indication message sent by the virtual machine management module, where the hard disk image add indication message carries the identifier of the user virtual machine, and an identifier and a hard disk image attribute that are of a hard disk image added by the virtual machine management module for the user virtual machine, and the hard disk image add indication message is specifically sent after the virtual machine management module creates the newly-added hard disk image for the user virtual machine according to a hard disk image add request sent by the system management module; and the execution unit is further configured to: after the receiving unit receives the hard disk image add indication message, allocate a key to the newly-added hard disk image, and update, to the first association relationship, the identifier of the user virtual machine, the identifier of the newly-added hard disk image, and the key allocated to the newly-added hard disk image.

With reference to the fifth aspect, in a second possible implementation manner of the fifth aspect, the receiving unit is further configured to receive an encryption request sent by the control module, where the encryption request carries the identifier of the user virtual machine, an identifier of a hard disk image into which data is to be written, and to-be-written data;

the execution unit is further configured to determine whether the first association relationship includes a correspondence between the identifier of the user virtual machine and the identifier of the hard disk image into which the data is to be written that are received by the receiving unit, and if yes, determine, according to the first association relationship, an encryption key corresponding to the identifier of the hard disk image into which the data is to be written, and encrypt the to-be-written data by using the encryption key to obtain encrypted data; and the message returning unit is further configured to: when the execution unit determines that the first association relationship does not include the correspondence between the identifier of the user virtual machine and the identifier of the hard disk image into which the data is to be written, return an encryption failure indication to the control module, and when the execution unit determines that the first association relationship includes the correspondence between the identifier of the user virtual machine and the identifier of the hard disk image into which the data is to be written, send the encrypted data to the control module.

With reference to the second possible implementation manner of the fifth aspect, in a third possible implementation manner of the fifth aspect, the receiving unit is further configured to receive a decryption request sent by the control module, where the decryption request carries the identifier of the user virtual machine, the encrypted data that is read, and the identifier of the hard disk image;

the execution unit is further configured to determine whether the first association relationship includes a correspondence between the identifier of the user virtual machine and the identifier of the hard disk image that are received by the receiving unit, and if yes, acquire, from the first association relationship, a decryption key corresponding to the identifier of the hard disk image, and decrypt the read encrypted data by using the decryption key to obtain decrypted data; and the message returning unit is further configured to send the obtained decrypted data to the control module.

According to a sixth aspect, an embodiment of the present invention provides a control apparatus in a virtualization system, where the apparatus includes a processor, a memory, a bus, and a communications interface; where the memory is configured to store a computer execution instruction, the processor is connected to the memory by using the bus, and when an apparatus managed by the path runs, the processor executes the computer execution instruction stored in the memory, so that the control apparatus in the virtualization system performs the method in either of the second aspect or the third aspect.

According to a seventh aspect, an embodiment of the present invention provides a computer readable medium, including a computer execution instruction, so that when a processor of a computer executes the computer execution instruction, the computer performs the method in either of the second aspect or the third aspect.

In the embodiments of the present invention, a control module for encryption and decryption is newly added to a VMM. When the control module acquires to-be-written data of a user virtual machine, the control module determines, according to an attribute of a hard disk image into which the data is to be written, whether the to-be-written data needs to be encrypted. When the to-be-written data needs to be encrypted, the control module sends the to-be-written data to an encryption and decryption virtual machine. The encryption and decryption virtual machine performs encryption processing on the to-be-written data and returns encrypted data to the control module. The control module writes the encrypted data into the corresponding hard disk image, thereby implementing storage of user data in an encryption manner. On the one hand, the control module in the VMM is configured to determine whether the to-be-written data needs to be encrypted and forward the to-be-written data, which makes it easy to implement a function and reduces system complexity of the VMM; in addition, because a dedicated encryption and decryption virtual machine implements encryption or decryption processing in this embodiment of the present invention without occupying a resource in the VMM, which avoids a resource conflict and improves system stability. On the other hand, the encryption and decryption virtual machine may allocate different keys to hard disk images of different user virtual machines, and provides or does not provide an encryption and decryption service for data flows from different sources, thereby implementing access rights control for the user virtual machine.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 6 is a schematic flowchart of a user virtual machine creating method according to an embodiment of the present invention;

FIG. 7 is a schematic structural diagram of a control apparatus in a virtualization system according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
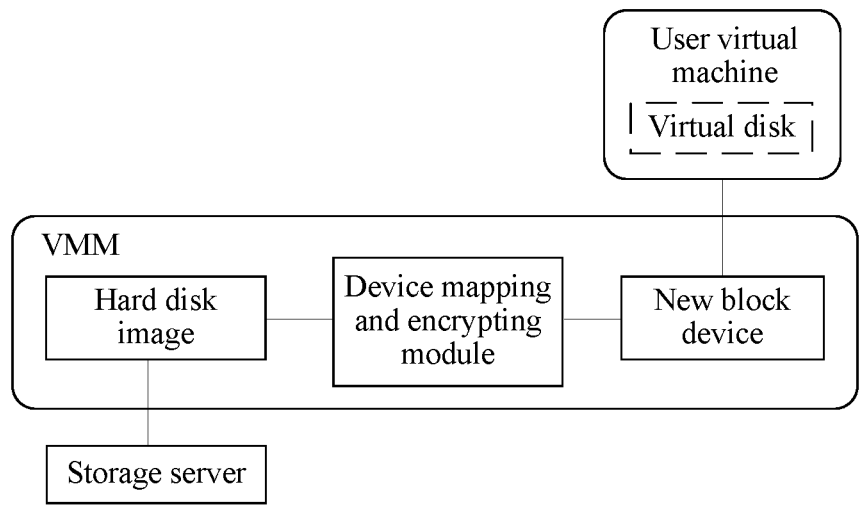
FIG. 1 is a schematic structural diagram for implementing an encryption and decryption technology in a prior-art virtualization system.
Figure 2:
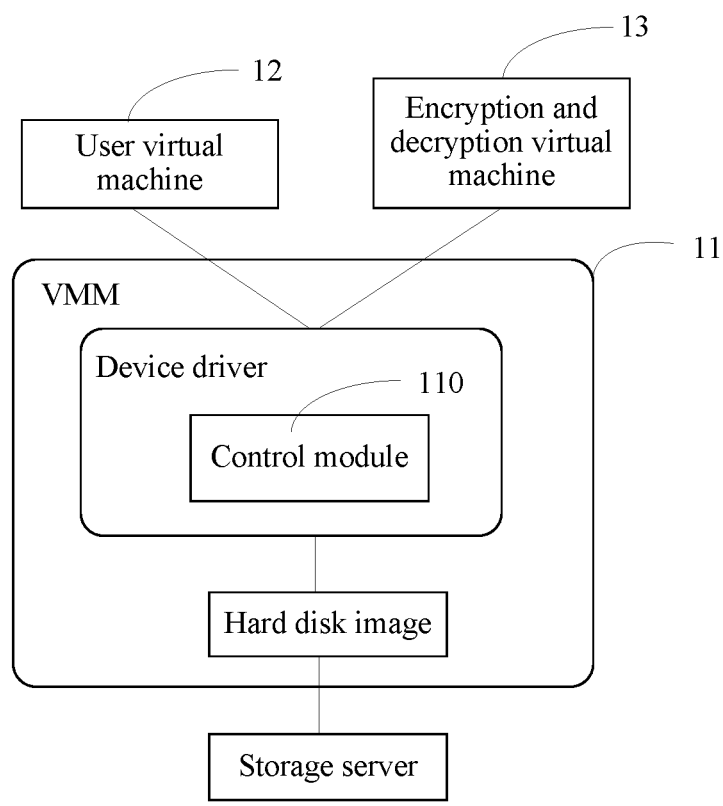
FIG. 2 is a schematic structural diagram of a virtualization system according to an embodiment of the present invention.

As shown in FIG. 2, FIG. 2 is a schematic structural diagram of a virtualization system according to an embodiment of the present invention. The virtualization system includes a VMM 11 and an encryption and decryption virtual machine 13, where the encryption and decryption virtual machine 13 records a first association relationship between a hard disk image identifier and a key, the key includes an encryption key, the VMM 11 includes a control module 110, and the virtualization system records a second association relationship between the hard disk image identifier and a hard disk image attribute. Cooperating with all components in the foregoing virtualization system, a user virtual machine 12 in FIG. 2 writes data into a hard disk image of the user virtual machine 12.

The control module 110 is configured to: acquire to-be-written data of the user virtual machine 12, determine, according to the second association relationship, a hard disk image attribute of a hard disk image that is of the user virtual machine 12 and into which the data is to be written, and if the determined hard disk image attribute is encryption, send an identifier of the hard disk image into which the data is to be written and the to-be-written data to the encryption and decryption virtual machine 13.

The encryption and decryption virtual machine 13 is configured to: determine, according to the first association relationship, an encryption key corresponding to the identifier of the hard disk image into which the data is to be written, encrypt the to-be-written data by using the encryption key to obtain encrypted data, and send the encrypted data to the control module 110.

The control module 110 is further configured to write the encrypted data into the hard disk image into which the data is to be written.

In this embodiment of the present invention, a control module for encryption and decryption is newly added to a VMM. When the control module acquires to-be-written data of a user virtual machine, the control module determines, according to an attribute of a hard disk image into which the data is to be written, whether the to-be-written data needs to be encrypted. When the to-be-written data needs to be encrypted, the control module sends the to-be-written data to an encryption and decryption virtual machine. The encryption and decryption virtual machine performs encryption processing on the to-be-written data and returns encrypted data to the control module. The control module writes the encrypted data into the corresponding hard disk image, thereby implementing storage of user data in an encryption manner. On the one hand, the control module in the VMM is configured to determine whether the to-be-written data needs to be encrypted and forward the to-be-written data, which makes it easy to implement a function and reduces system complexity of the VMM; in addition, because a dedicated encryption and decryption virtual machine implements encryption or decryption processing in this embodiment of the present invention without occupying a resource in the VMM, which avoids a resource conflict and improves system stability. On the other hand, the encryption and decryption virtual machine may allocate different keys to hard disk images of different user virtual machines, and provides or does not provide an encryption and decryption service for data flows from different sources, thereby implementing access rights control for the user virtual machine.

Figure 3:
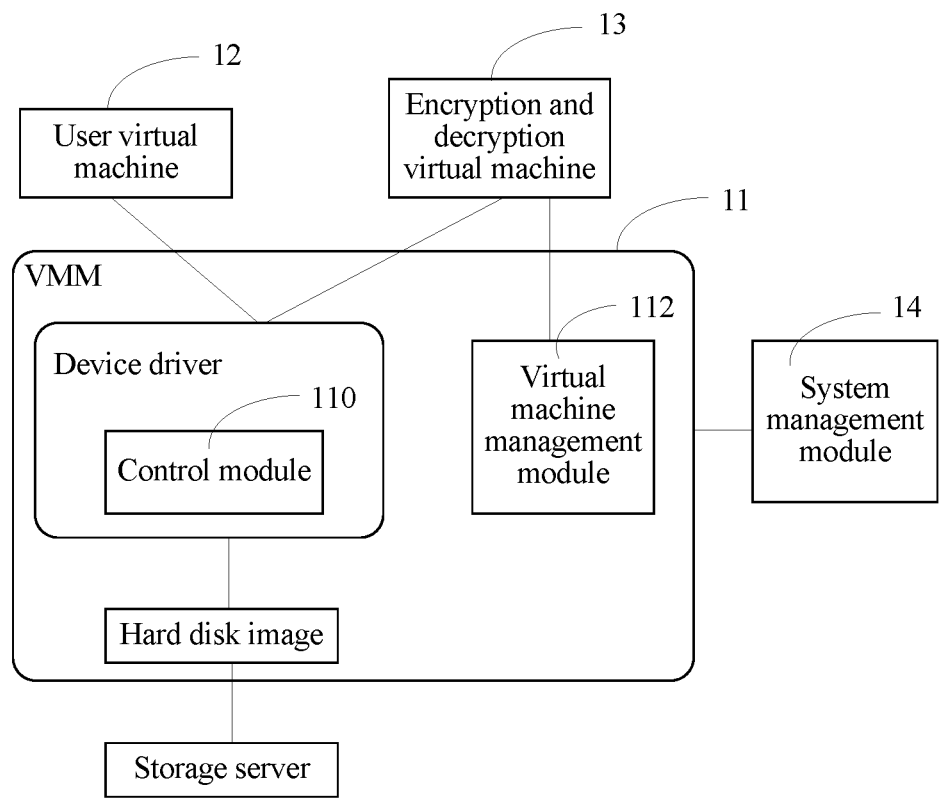
FIG. 3 is a schematic structural diagram of another virtualization system according to an embodiment of the present invention.

Further, in a specific implementation scenario, as shown in FIG. 3, FIG. 3 is a schematic structural diagram of another virtualization system according to an embodiment of the present invention. The virtualization system further includes a system management module 14, and the VMM 11 further includes a virtual machine management module 112.

In this embodiment of the present invention, an encryption and decryption virtual machine 13 is first created. A specific manner for creating the encryption and decryption virtual machine 13 may be an existing virtual machine creating manner. A difference lies in that the newly-created encryption and decryption virtual machine 13 is specially responsible for encryption or decryption processing, and the encryption or decryption processing includes key allocation and data encryption and decryption. In a specific application scenario, various programs, such as a rights management program, a key management program, and an encryption and decryption program, that are related to an encryption and decryption service may be installed in the encryption and decryption virtual machine 13, so that the encryption and decryption virtual machine 13 is dedicated to encryption or decryption processing. A specific implementation form is not limited in the present invention.

Corresponding to the foregoing procedure, this embodiment of the present invention further provides a procedure in which the user virtual machine 12 reads data. A key allocated by the foregoing encryption and decryption virtual machine 13 to a hard disk image of the user virtual machine 12 includes an encryption key and a decryption key. A specific type of the key is not limited in this embodiment of the present invention.

When the user virtual machine 12 needs to read data from a hard disk image, the user virtual machine 12 triggers a read request, where the read request carries an identifier of to-be-read data. A device driver acquires the read request, and the device driver invokes the control module 110 to process the read request.

The control module 110 is further configured to: acquire the read request triggered by the user virtual machine, read data from a hard disk image from which the data is to be read, determine that the read data is encrypted data, and send a decryption request to the encryption and decryption virtual machine 13, where the decryption request carries an identifier of the user virtual machine, the read encrypted data, and an identifier of the hard disk image.

The encryption and decryption virtual machine 13 is further configured to: receive the decryption request, determine whether the first association relationship includes a correspondence between the identifier of the hard disk image and the identifier of the user virtual machine that sends the read request, and if yes, acquire, from the first association relationship, a decryption key corresponding to the identifier of the hard disk image, decrypt the read encrypted data by using the decryption key, and send obtained decrypted data to the control module 110.

The control module 110 is further configured to return the decrypted data to the user virtual machine 12.

On the other hand, the control module 110 is further configured to: when it is determined that the read data is non-encrypted data, return the read non-encrypted data to the user virtual machine 12.

The encryption and decryption virtual machine 13 records a first association relationship between the identifier of the user virtual machine, the hard disk image identifier, and the key allocated to the hard disk image of the user virtual machine 12. In a read procedure and a write procedure, the encryption and decryption virtual machine 13 may determine, according to a received encryption request or a received decryption request, a key of a hard disk image that the encryption request or the decryption request is for, thereby providing encryption or decryption processing. Further, in the following manner, this embodiment of the present invention further provides a manner of recording the foregoing first association relationship in a process of creating the user virtual machine 12: The system management module 14 is further configured to send a virtual machine create request to the virtual machine management module 112, where the virtual machine establishing request carries a hard disk image attribute of a to-be-created user virtual machine 12; the virtual machine management module 112 is further configured to: receive the virtual machine create request, create the user virtual machine 12, create a hard disk image for the created user virtual machine 12, allocate a hard disk image identifier, determine, according to the virtual machine create request, a hard disk image attribute corresponding to the allocated hard disk image identifier, and send a virtual machine create indication message to the encryption and decryption virtual machine 13, where the virtual machine create indication message carries the identifier of the created user virtual machine 12, the allocated hard disk image identifier, and the hard disk image attribute corresponding to the allocated hard disk image identifier; and the encryption and decryption virtual machine 13 is further configured to: receive the virtual machine create indication message, allocate a key to the created hard disk image, and establish the first association relationship between the identifier of the created user virtual machine 12, the allocated hard disk image identifier, and the key.

The encryption and decryption virtual machine 13 is further configured to send a virtual machine create response message to the system management module 14, where the virtual machine create response message includes the identifier of the created user virtual machine 12.

When processing a write request or a read request initiated by the user virtual machine 12, the control module 110 provided in this embodiment of the present invention needs to determine whether encryption or decryption processing needs to be performed on data involved in a read operation or a write operation, and when the encryption or decryption processing needs to be performed on the foregoing data, sends the involved data to the encryption and decryption virtual machine 13. The control module 110 determines, according to the foregoing second association relationship, whether the encryption or decryption processing needs to be performed on the data involved in the read operation or the write operation. The control module 110 may establish the foregoing second association relationship in a process of starting the user virtual machine 12, and a specific procedure includes: The system management module 14 is configured to send a virtual machine start request to the virtual machine management module 112, where the virtual machine start request carries an identifier of a to-be-started user virtual machine 12; the virtual machine management module 112 is configured to: receive the virtual machine start request, start the to-be-started user virtual machine 12 according to the virtual machine start request, and send a hard disk image identifier and a hard disk image attribute that are of the started user virtual machine 12 to the control module 110; and the control module 110 is further configured to: receive and record the hard disk image identifier and the hard disk image attribute that are of the started user virtual machine 12, and establish the second association relationship.

It should be noted that, in a specific implementation scenario, the system management module may be specifically a cloud computing operating system management module.

Figure 4A:
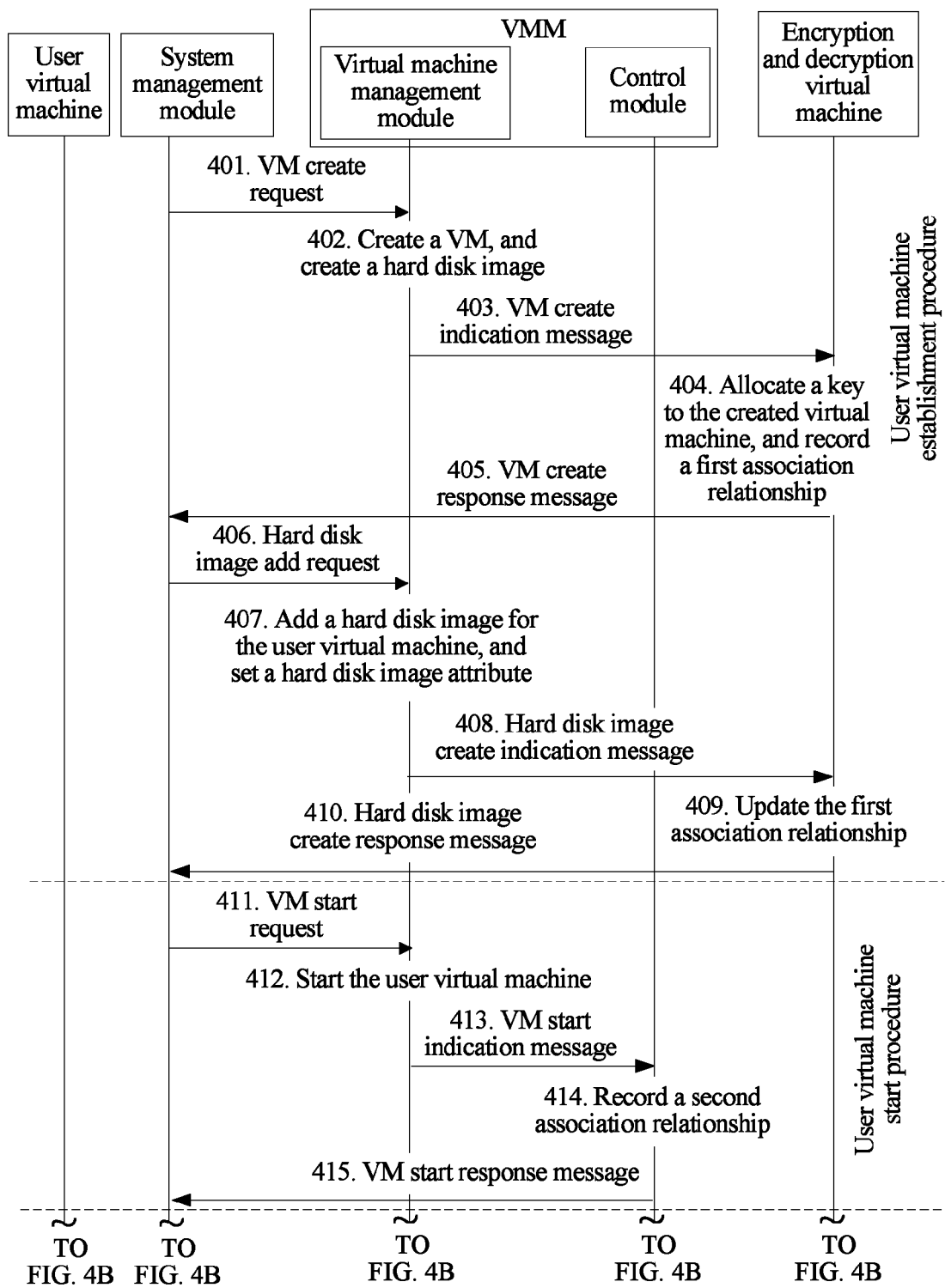
FIG. 4A and FIG. 4B are a schematic flowchart of an encryption and decryption method in a virtualization system according to an embodiment of the present invention.
Figure 4B:
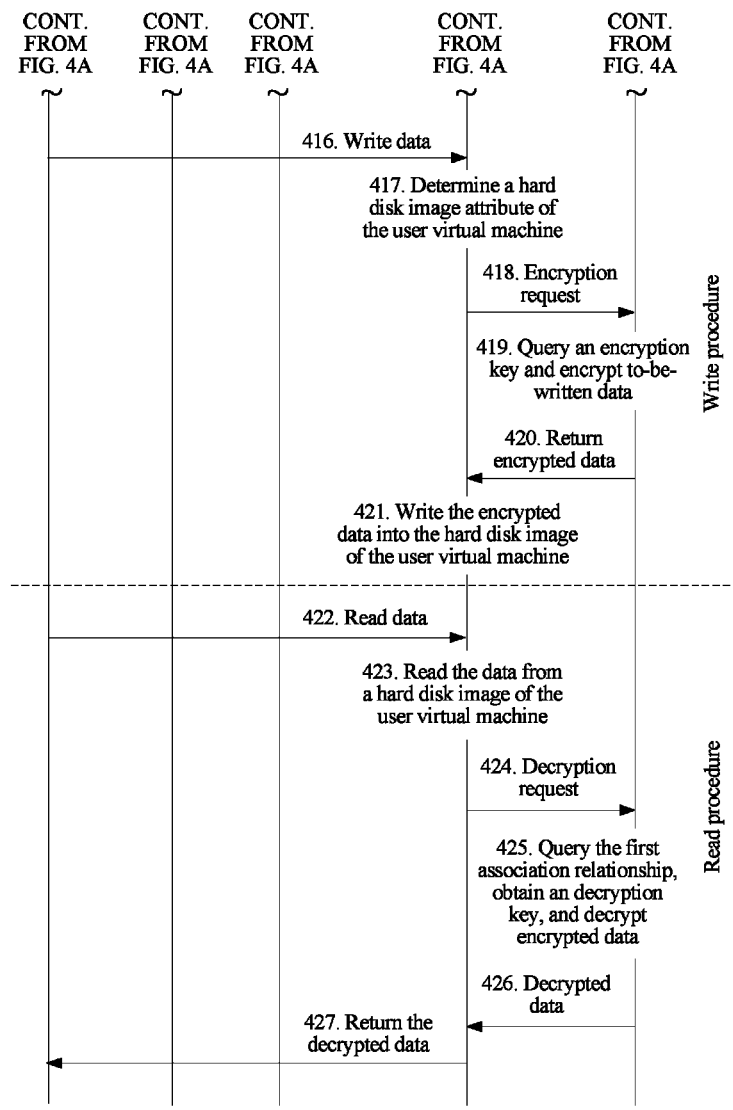

With reference to the system structure shown in FIG. 3, as shown in FIG. 4A and FIG. 4B, FIG. 4A and FIG. 4B are a schematic flowchart of an encryption and decryption method in a virtualization system according to an embodiment of the present invention, and the method includes:

Step 401: A system management module sends a virtual machine create request to a virtual machine management module, where the virtual machine create request is used to request to create a user virtual machine.

Specifically, a system administrator sets a hard disk image attribute of a to-be-created user virtual machine by using a management interface. When the system management module sends the virtual machine create request, the virtual machine create request carries the hard disk image attribute of the to-be-created user virtual machine. For example, the system management module indicates, in the virtual machine create request, to create three hard disk images for the user virtual machine, where a hard disk image attribute of one hard disk image is encryption.

Step 402: The virtual machine management module receives the virtual machine create request, creates a user virtual machine, creates a hard disk image for the created user virtual machine, allocates a hard disk image identifier, and determines, according to the virtual machine create request, a hard disk image attribute corresponding to the allocated hard disk image identifier.

Specifically, when creating the user virtual machine, the virtual machine management module allocates a virtual machine identifier to the user virtual machine and configures information such as a memory, a CPU, and a network adapter. The virtual machine management module allocates the hard disk image identifier to the created hard disk image, determines the hard disk image attribute of the created hard disk image according to information carried in the virtual machine create request, and connects the hard disk image to the user virtual machine. For example, the virtual machine management module creates three hard disk images for the created user virtual machine, and determines, according to the virtual machine create request, that a hard disk image attribute of one hard disk image is encryption.

Step 403: The virtual machine management module sends a virtual machine create indication message to an encryption and decryption virtual machine, where the virtual machine create indication message carries an identifier of the created user virtual machine, an identifier of a hard disk image allocated to the created user virtual machine, and the hard disk image attribute of the created user virtual machine.

Step 404: The encryption and decryption virtual machine receives the virtual machine create indication message, allocates a key to the hard disk image of the user virtual machine, and records a first association relationship between the identifier of the user virtual machine, the hard disk image identifier, and the key.

Step 405: The encryption and decryption virtual machine returns a virtual machine create response message to the system management module, where the virtual machine create response message carries the identifier of the created user virtual machine.

Step 406: When the system management module determines that a hard disk image needs to be added for the user virtual machine, the system management module sends a hard disk image add request to the virtual machine management module, where the hard disk image add request message carries the identifier of the user virtual machine and an attribute of a newly-added hard disk image.

It should be noted that, unlike a hard disk image add procedure in the prior art, in this embodiment of the present invention, the hard disk image add request carries a hard disk image attribute that is used to indicate whether the newly-added hard disk image needs to be encrypted.

Step 407: The virtual machine management module receives the hard disk image add request message, creates a new hard disk image for the user virtual machine, allocates a hard disk image identifier to the new hard disk image, sets a hard disk image attribute of the new hard disk image according to the hard disk image add request message, connects the new hard disk image to the user virtual machine, and uses the new hard disk image as an additional hard disk image of the user virtual machine.

Step 408: The virtual machine management module sends the identifier of the user virtual machine, the identifier of the new hard disk image, and the hard disk image attribute of the new hard disk image to the encryption and decryption virtual machine.

Step 409: The encryption and decryption virtual machine allocates a key to the new hard disk image, and updates the first association relationship, so as to record a correspondence between the identifier of the user virtual machine, the hard disk image identifier of the new hard disk image, and the key.

Step 410: The encryption and decryption virtual machine returns a hard disk image add response message to the system management module, where the hard disk image add response message carries the identifier of the user virtual machine and the identifier of the hard disk image that is newly added for the user virtual machine.

Step 411: The system management module sends a virtual machine start request to the virtual machine management module, where the virtual machine start request carries an identifier of a to-be-started user virtual machine.

Step 412: The virtual machine management module starts the user virtual machine and connects the user virtual machine to a hard disk image.

Step 413: The virtual machine management module sends a virtual machine start indication message to the control module, and sends the identifier of the started user virtual machine, an identifier of the hard disk image that belongs to the user virtual machine, and a corresponding hard disk image attribute to the control module.

Step 414: The control module records the identifier and the hard disk image attribute that are of the hard disk image that belongs to the started user virtual machine, so as to establish a second association relationship.

It should be noted that the second association relationship may further include the identifier of the started user virtual machine.

Step 415: The control module sends a virtual machine start response message to the system management module, where the virtual machine start response message carries the identifier of the user virtual machine and the identifier of the hard disk image.

Step 416: When the user virtual machine writes data into a hard disk image and triggers a write request, where the write request carries the to-be-written data.

In specific implementation, when the user virtual machine writes data to the hard disk image that belongs to the user virtual machine, a device driver acquires the write request, and the device driver invokes the control module to process the write request.

A manner in the prior art may be used in a process in which the user virtual machine writes the data into the hard disk image, which is not limited in this embodiment of the present invention. It should be noted that, in this embodiment of the present invention, in the foregoing process of writing the data, the device driver invokes the control module, so that the control module may determine an attribute of the hard disk image into which the data is to be written, and therefore when the to-be-written data needs to be encrypted, the to-be-written data is forwarded to the encryption and decryption virtual machine, and an encryption process of the to-be-written data is complete. Details are described in the following procedure.

Step 417: The control module acquires the write request, queries the second association relationship, determines, according to the second association relationship, a hard disk image attribute of the hard disk image that is of the user virtual machine and into which the data is to be written, and if the determined hard disk image attribute is encryption, performs step 418, or if the determined hard disk image attribute is non-encryption, the control module sends, by using a device driver, the to-be-written data to the hard disk image that is of the user virtual machine and into which the data is to be written.

Step 418: The control module sends an encryption request to the encryption and decryption virtual machine, where the encryption request carries the to-be-written data and an identifier header, and the identifier header is used to distinguish a user virtual machine and a hard disk image that are corresponding to the to-be-written data. Specifically, the identifier header includes an identifier and a hard disk image attribute that are of the hard disk image into which the data is to be written. Further, the identifier header may further include an identifier of the user virtual machine to which the hard disk image belongs.

Step 419: The encryption and decryption virtual machine receives the encryption request, determines, according to the first association relationship, an encryption key corresponding to the identifier of the hard disk image into which the data is to be written, and encrypts the to-be-written data by using the encryption key to obtain encrypted data.

Further, when the first association relationship further records the identifier of the user virtual machine, the encryption and decryption virtual machine may perform rights management on the user virtual machine that initiates the write request. Specifically, the encryption and decryption virtual machine queries the first association relationship and determines whether the first association relationship records a correspondence between the identifier of the virtual machine and the identifier of the hard disk image that are in the received identifier header; if yes, authentication is successful, and the encryption key corresponding to the identifier of the hard disk image is acquired; if no, it indicates that the user virtual machine does not match the hard disk image, and the user virtual machine has no right to write data into the hard disk image.

Specifically, in a specific implementation scenario, the encryption and decryption virtual machine may include a key management module, and the key management module manages the key in the first association relationship.

Step 420: The encryption and decryption virtual machine returns, to the control module, the encrypted data obtained after the to-be-written data is encrypted.

Step 421: The control module invokes the device driver to write the encrypted data into the hard disk image of the user virtual machine.

Step 422: When the user virtual machine reads data from a hard disk image and triggers a read request, where the write request carries an identifier of the to-be-read data.

In specific implementation, when reading data from the hard disk image of the user virtual machine, the user virtual machine triggers the read request, the device driver acquires the read request, and the device driver invokes the control module to process the read request.

Step 423: The control module invokes a function of the device driver to read the data from the hard disk image of the user virtual machine, and if the read data is encrypted data, performs step 424.

Specifically, when the hard disk image is connected to the virtual machine, the device driver including the control module is loaded, and at the same time, the control module in the device driver may be initialized. The control module invokes a function of an existing device driver to perform addressing and reads required data from a disk. The device driver may read the required data from the disk in various manners in the prior art, which is not limited in this embodiment of the present invention. In this embodiment of the present invention, the control module only needs to have a capability of invoking a function of a device driver.

The control module may determine, by determining whether a hard disk image attribute is encryption, whether the read data is encrypted data. Specifically, if the attribute of the hard disk image from which data is to be read is encryption, it indicates that the data read by the control module is encrypted data, and step 424 is performed, so that the encryption and decryption virtual machine decrypts the read encrypted data; if no, it indicates that the data read by the control module is non-encrypted data, and the control module directly returns the read data to the user virtual machine, with no need to perform decryption.

Step 424: The control module sends a decryption request to the encryption and decryption virtual machine, where the decryption request carries the encrypted data, the identifier of the user virtual machine, and the identifier of the hard disk image.

Step 425: The encryption and decryption virtual machine queries the first association relationship according to the received identifier of the user virtual machine and the received identifier of the hard disk image, acquires a decryption key of the hard disk image of the user virtual machine, and decrypts the encrypted data by using the decryption key to obtain a plaintext.

Specifically, the encryption and decryption virtual machine searches for a correspondence that is between an identifier of a user virtual machine and an identifier of a hard disk image and that is stored in the encryption and decryption virtual machine, determines whether the received identifier of the hard disk image and the identifier of the virtual machine to which the hard disk image belongs is stored in the correspondence, and if yes, acquires the decryption key corresponding to the recorded identifier of the hard disk image.

Specifically, the key management module in the encryption and decryption virtual machine is configured to manage a decryption key corresponding to a hard disk image of each user virtual machine.

Step 426: The encryption and decryption virtual machine adds the plaintext obtained after decryption to a decryption response and returns the decryption response to the control module.

Step 427: The control module returns the received plaintext obtained after decryption to the user virtual machine.

It should be noted that steps 401 to 410 are a user virtual machine create procedure, and in this procedure, the encryption and decryption virtual machine records the first association relationship. Steps 411 to 415 are a user virtual machine start procedure, where when the user virtual machine is started, the virtual machine management module sends the hard disk image identifier and the hard disk image attribute that are of the started user virtual machine to the control module, and the control module records the second association relationship. Steps 416 to 421 are a write procedure, where when acquiring to-be-written data of the user virtual machine, the control module determines the attribute of the corresponding hard disk image into which the data is to be written, and if the to-be-written data needs to be encrypted, the encryption and decryption virtual machine encrypts the to-be-written data according to the first association relationship. Steps 422 to 427 are a read procedure, where when the control module acquires the read request triggered by the user virtual machine, if the read data is encrypted data, the control module forwards the encrypted data to the encryption and decryption virtual machine for decryption, thereby obtaining the plaintext.

This embodiment of the present invention provides a data encryption and decryption method in a virtualization system. In this embodiment of the present invention, on the one hand, a dedicated encryption and decryption virtual machine is responsible for encryption and decryption processing, a user virtual machine does not need to be changed, and other assistant software does not need to be installed either. On the other hand, the encryption and decryption virtual machine is located outside of the user virtual machine, may encrypt a non-system disk of the user virtual machine, and may also encrypt a system disk of the user virtual machine.

In this embodiment of the present invention, similar to a common virtual machine, a resource such as a memory or a CPU that the foregoing encryption and decryption virtual machine requires may be dynamically allocated, which avoids a resource conflict with a host operating system and virtualization software, and improves host reliability. A limiting port is opened on the encryption and decryption virtual machine, so as to limit installation of another application, which also helps to further improve system security. Further, in specific product implementation, because of independence of the encryption and decryption virtual machine, a manner such as a watchdog technology, a two-process technology, and a hot backup technology may further be used for the encryption and decryption virtual machine to improve reliability, and software such as anti-virus software, anti-Trojan horse software, and a firewall may be installed to improve security.

Optimally, a control module provided in this embodiment of the present invention may be installed in a device driver of a VMM. The control module may invoke a function of the device driver and may effectively provide an encryption and decryption service for hard disk images of various types, and at the same time, creation, publication, installment, start, or the like of a host software system is not affected. Optionally, the control module may also be independent of the device driver. In this case, the control module has a capability of invoking a function of a device driver.

Preferably, a key allocated to the hard disk image may be stored in the encryption and decryption virtual machine, so that neither a host nor an outside of the virtualization system can learn the key and better confidentiality is ensured. On the other hand, a user virtual machine identifier, a hard disk image identifier, related user information, and the like may be stored in the encryption and decryption virtual machine. Different keys may be allocated to hard disk images of different user virtual machines. For data flows from different sources, an encryption and decryption service is provided or is not provided, and access right control for a user virtual machine is implemented.

In this embodiment of the present invention, the hard disk image may be of a type such as a large file, a local partition, a local block device, a network block device provided by the internet Small Computer System Interface (iSCSI) protocol, a shared file provided by the common Internet file system (CIFS) protocol or the Network File System (NFS) protocol, or the like, which is not limited in this embodiment of the present invention.

Figure 5:
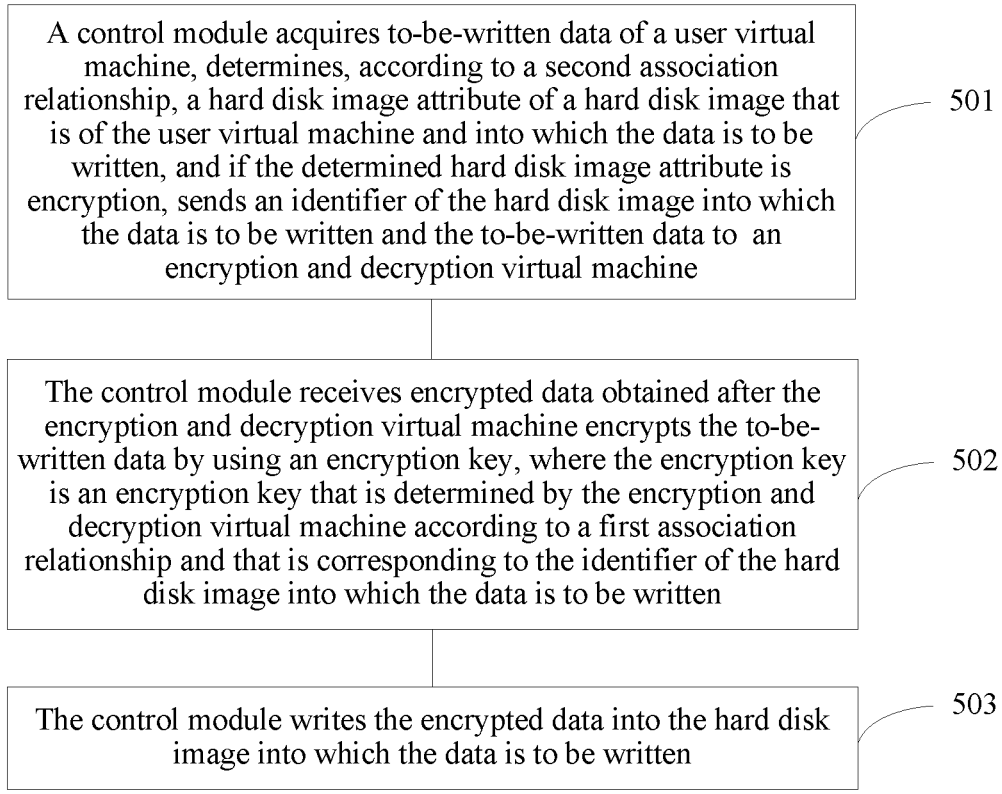
FIG. 5 is a schematic flowchart of another encryption and decryption method in a virtualization system according to an embodiment of the present invention.

As shown in FIG. 5, FIG. 5 is a schematic flowchart of another encryption and decryption method in a virtualization system, where the method is applied to the virtualization system, the virtualization system includes a virtual machine monitor VMM and an encryption and decryption virtual machine, the VMM includes a control module, the encryption and decryption virtual machine records a first association relationship between a hard disk image identifier and a key, the key includes an encryption key, the virtualization system records a second association relationship between the hard disk image identifier and a hard disk image attribute, and the method includes:

Step 501: The control module acquires to-be-written data of a user virtual machine, determines, according to the second association relationship, a hard disk image attribute of a hard disk image that is of the user virtual machine and into which the data is to be written, and if the determined hard disk image attribute is encryption, sends an identifier of the hard disk image into which the data is to be written and the to-be-written data to the encryption and decryption virtual machine.

Step 502: The control module receives encrypted data obtained after the encryption and decryption virtual machine encrypts the to-be-written data by using the encryption key, where the encryption key is an encryption key that is determined by the encryption and decryption virtual machine according to the first association relationship and that is corresponding to the identifier of the hard disk image into which the data is to be written.

Step 503: The control module writes the encrypted data into the hard disk image into which the data is to be written.

In this embodiment of the present invention, a control module for encryption and decryption is newly added to a VMM. When the control module acquires to-be-written data of a user virtual machine, the control module determines, according to an attribute of a hard disk image into which the data is to be written, whether the to-be-written data needs to be encrypted. When the to-be-written data needs to be encrypted, the control module sends the to-be-written data to an encryption and decryption virtual machine. The encryption and decryption virtual machine performs encryption processing on the to-be-written data and returns encrypted data to the control module. The control module writes the encrypted data into the corresponding hard disk image, thereby implementing storage of user data in an encryption manner. On the one hand, the control module in the VMM is configured to determine whether the to-be-written data needs to be encrypted and forward the to-be-written data, which makes it easy to implement a function and reduces system complexity of the VMM; in addition, because a dedicated encryption and decryption virtual machine implements encryption or decryption processing in this embodiment of the present invention without occupying a resource in the VMM, which avoids a resource conflict and improves system stability. On the other hand, the encryption and decryption virtual machine may allocate different keys to hard disk images of different user virtual machines, and provides or does not provide an encryption and decryption service for data flows from different sources, thereby implementing access rights control for the user virtual machine.

As shown in FIG. 6, FIG. 6 is a schematic flowchart of a user virtual machine create method, where the method is applied to a virtualization system, the virtualization system includes a VMM, a system management module, and an encryption and decryption virtual machine, the VMM includes a virtual machine management module, and the method includes:

Step 601: The encryption and decryption virtual machine receives a virtual machine create indication message sent by the virtual machine management module, where the virtual machine create indication message carries an identifier of a created user virtual machine, an identifier of a hard disk image allocated to the created user virtual machine, and a hard disk image attribute corresponding to the allocated hard disk image identifier, and the virtual machine create indication message is specifically sent after the virtual machine management module creates the user virtual machine and a hard disk image according to a virtual machine create request sent by the system management module.

Step 602: The encryption and decryption virtual machine allocates a key to the created hard disk image, and establishes a first association relationship between the identifier of the created user virtual machine, the allocated hard disk image identifier, and the key.

Step 603: The encryption and decryption virtual machine sends a virtual machine create response message to the system management module, where the virtual machine create response message includes the identifier of the created user virtual machine.

After creation of the virtual machine is complete, a new hard disk image may further be added to the user virtual machine, and a key is allocated to the newly-added hard disk image. A specific procedure includes:

receiving, by the encryption and decryption virtual machine, a hard disk image add indication message sent by the virtual machine management module, where the hard disk image add indication message carries the identifier of the user virtual machine, and an identifier and a hard disk image attribute that are of a hard disk image added by the virtual machine management module for the user virtual machine, and the hard disk image add indication message is specifically sent after the virtual machine management module creates the newly-added hard disk image for the user virtual machine according to a hard disk image add request sent by the system management module; and allocating, by the encryption and decryption virtual machine, a key to the newly-added hard disk image, and updating, to the first association relationship, the identifier of the user virtual machine, the identifier of the newly-added hard disk image, and the key allocated to the newly-added hard disk image.

In the foregoing virtual machine create process, a virtual machine management module identifies a hard disk image for which an encryption and decryption service needs to be provided, and sends an identifier of a user virtual machine and a hard disk image identifier to an encryption and decryption virtual machine. The encryption and decryption virtual machine allocates a key to the foregoing hard disk image and records the first association relationship, so that the encryption and decryption virtual machine may perform encryption or decryption processing on to-be-written data or to-be-read data of the foregoing hard disk image of the foregoing user virtual machine.

Corresponding to the foregoing system and method embodiments, as shown in FIG. 7, FIG. 7 is a schematic structural diagram of a control apparatus in a virtualization system, where the control apparatus is located in a VMM of the virtualization system, the virtualization system further includes an encryption and decryption virtual machine, the encryption and decryption virtual machine records a first association relationship between a hard disk image identifier and a key, the key includes an encryption key, the virtualization system records a second association relationship between the hard disk image identifier and a hard disk image attribute, and the control apparatus includes:

an acquiring unit 701, configured to acquire to-be-written data of a user virtual machine;

a processing unit 702, configured to determine, according to the second association relationship, a hard disk image attribute of a hard disk image that is of the user virtual machine and into which the data is to be written;

a sending unit 703, configured to: when the hard disk image attribute determined by the processing unit 702 is encryption, send an identifier of the hard disk image into which the data is to be written and the to-be-written data to the encryption and decryption virtual machine; where the acquiring unit 701 is further configured to receive encrypted data obtained after the encryption and decryption virtual machine encrypts the to-be-written data by using the encryption key, where the encryption key is an encryption key that is determined by the encryption and decryption virtual machine according to the first association relationship and that is corresponding to the identifier of the hard disk image into which the data is to be written; and a write unit 704, configured to write the encrypted data received by the acquiring unit 701 into the hard disk image into which the data is to be written.

Further, the key further includes a decryption key.

The acquiring unit 701 is further configured to acquire a read request triggered by the user virtual machine.

The processing unit 702 is further configured to read data from a hard disk image from which data is to be read, and determine that the read data is encrypted data.

The sending unit 703 is further configured to: when the processing unit 702 determines that the read data is the encrypted data, send a decryption request to the encryption and decryption virtual machine, where the decryption request carries the identifier of the user virtual machine, the read encrypted data, and an identifier of the hard disk image.

The acquiring unit 701 is further configured to receive decrypted data that is returned by the encryption and decryption virtual machine, where after determining that the first association relationship includes a correspondence between the identifier of the user virtual machine and the identifier of the hard disk image, the encryption and decryption virtual machine obtains the decrypted data by decrypting the encrypted data by using a decryption key that is determined according to the first association relationship and that is corresponding to the identifier of the hard disk image.

The sending unit 703 is further configured to return the decrypted data received by the acquiring unit 701 to the user virtual machine.

The sending unit 703 is further configured to: when the processing unit 702 determines that the read data is non-encrypted data, return the read non-encrypted data to the user virtual machine.

The acquiring unit 701 is further configured to receive a virtual machine start indication message sent by a virtual machine management module, where the virtual machine start indication message carries an identifier of a started user virtual machine, and a hard disk image identifier and a hard disk image attribute that are of the started user virtual machine.

The processing unit 702 is further configured to record the hard disk image identifier and the hard disk image attribute that are of the started user virtual machine, and update the second association relationship.

The acquiring unit 701 is specifically configured to acquire, from a device driver, a write request triggered by the user virtual machine, where the write request carries the to-be-written data.

Figure 8:
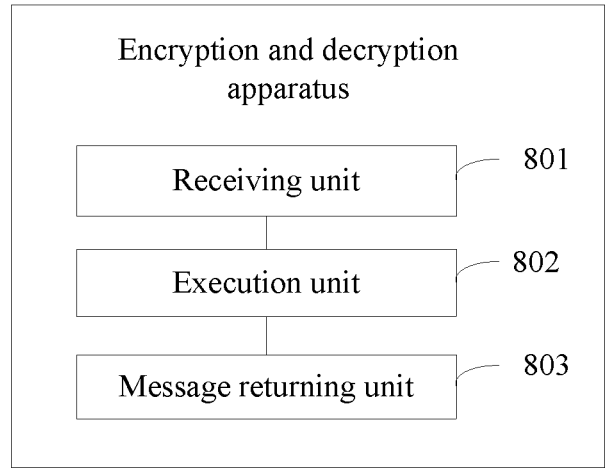
FIG. 8 is a schematic structural diagram of an encryption and decryption apparatus in a virtualization system according to an embodiment of the present invention.

Corresponding to the method in FIG. 6, as shown in FIG. 8, an embodiment of the present invention further provides a schematic structural diagram of an encryption and decryption apparatus in a virtualization system, where the encryption and decryption apparatus is applied to the virtualization system, the virtualization system includes the encryption and decryption apparatus, a VMM, and a system management module, the VMM includes a virtual machine management module, and the encryption and decryption apparatus includes:

a receiving unit 801, configured to receive a virtual machine create indication message sent by the virtual machine management module, where the virtual machine create indication message carries an identifier of a created user virtual machine, an identifier of a hard disk image allocated to the created user virtual machine, and a hard disk image attribute corresponding to the allocated hard disk image identifier, and the virtual machine create indication message is specifically sent after the virtual machine management module creates the user virtual machine and a hard disk image according to a virtual machine create request sent by the system management module;

an execution unit 802, configured to: after the receiving unit 801 receives the virtual machine create indication message, allocate a key to the created hard disk image, and establish a first association relationship between the identifier of the created user virtual machine, the allocated hard disk image identifier, and the key; and a message returning unit 803, configured to send a virtual machine create response message to the system management module, where the virtual machine create response message includes the identifier of the created user virtual machine.

Further, the receiving unit 801 is further configured to receive a hard disk image add indication message sent by the virtual machine management module, where the hard disk image add indication message carries the identifier of the user virtual machine, and an identifier and a hard disk image attribute that are of a hard disk image added by the virtual machine management module for the user virtual machine, and the hard disk image add indication message is specifically sent after the virtual machine management module creates the newly-added hard disk image for the user virtual machine according to a hard disk image add request sent by the system management module.

The execution unit 802 is further configured to: after the receiving unit 801 receives the hard disk image add indication message, allocate a key to the newly-added hard disk image, and update, to the first association relationship, the identifier of the user virtual machine, the identifier of the newly-added hard disk image, and the key allocated to the newly-added hard disk image.

The VMM includes a control module.

The receiving unit 801 is further configured to receive an encryption request sent by the control module, where the encryption request carries the identifier of the user virtual machine, an identifier of a hard disk image into which data is to be written, and to-be-written data.

The execution unit 802 is further configured to determine whether the first association relationship includes a correspondence between the identifier of the user virtual machine and the identifier of the hard disk image into which the data is to be written that are received by the receiving unit 801, if yes, determine, according to the first association relationship, an encryption key corresponding to the identifier of the hard disk image into which the data is to be written, and encrypt the to-be-written data by using the encryption key to obtain encrypted data.

The message returning unit 803 is further configured to: when the execution unit 802 determines that the first association relationship does not include the correspondence between the identifier of the user virtual machine and the identifier of the hard disk image into which the data is to be written, return an encryption failure indication to the control module, and when the execution unit determines that the first association relationship includes the correspondence between the identifier of the user virtual machine and the identifier of the hard disk image into which the data is to be written, send the encrypted data to the control module.

The receiving unit 801 is further configured to receive a decryption request sent by the control module, where the decryption request carries the identifier of the user virtual machine, the encrypted data that is read, and the identifier of the hard disk image.

The execution unit 802 is further configured to determine whether the first association relationship includes a correspondence between the identifier of the user virtual machine and the identifier of the hard disk image that are received by the receiving unit 801, if yes, acquire, from the first association relationship, a decryption key corresponding to the identifier of the hard disk image, and decrypt the read encrypted data by using the decryption key to obtain decrypted data.

The message returning unit is further configured to send the obtained decrypted data to the control module.

In this embodiment of the present invention, a control module for encryption and decryption is newly added to a VMM. When the control module acquires to-be-written data of a user virtual machine, the control module determines, according to an attribute of a hard disk image into which the data is to be written, whether the to-be-written data needs to be encrypted. When the to-be-written data needs to be encrypted, the control module sends the to-be-written data to an encryption and decryption virtual machine. The encryption and decryption virtual machine performs encryption processing on the to-be-written data and returns encrypted data to the control module. The control module writes the encrypted data into the corresponding hard disk image, thereby implementing storage of user data in an encryption manner. On the one hand, the control module in the VMM is configured to determine whether the to-be-written data needs to be encrypted and forward the to-be-written data, which makes it easy to implement a function and reduces system complexity of the VMM; in addition, because a dedicated encryption and decryption virtual machine implements encryption or decryption processing in this embodiment of the present invention without occupying a resource in the VMM, which avoids a resource conflict and improves system stability. On the other hand, the encryption and decryption virtual machine may allocate different keys to hard disk images of different user virtual machines, and provides or does not provide an encryption and decryption service for data flows from different sources, thereby implementing access rights control for the user virtual machine.

Figure 9:
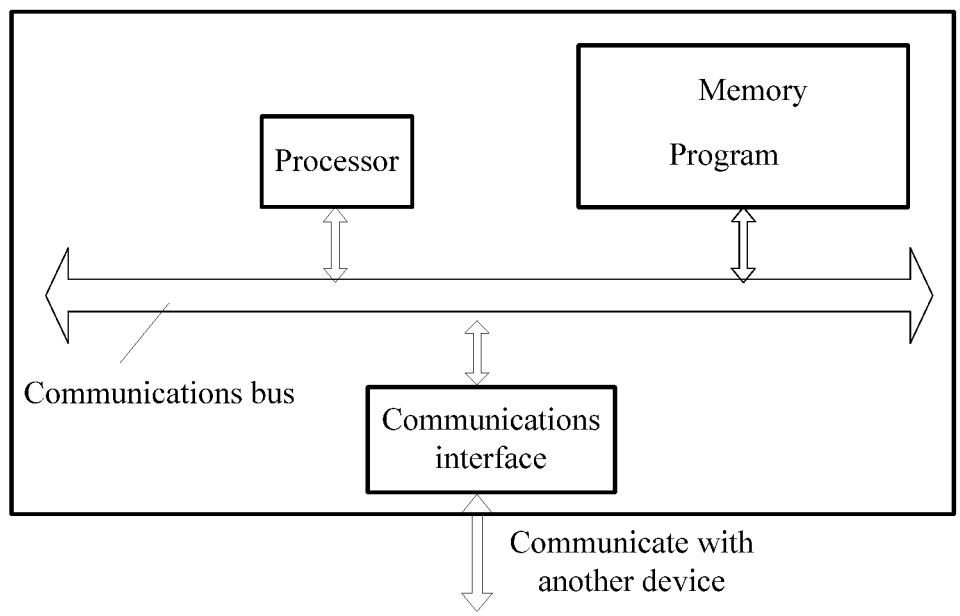
FIG. 9 is a schematic diagram of hardware composition of a control apparatus in a virtualization system according to an embodiment of the present invention.

Further, as shown in FIG. 9, FIG. 9 is a schematic diagram of hardware composition of a control apparatus according to an embodiment of the present invention. In specific product implementation, the control apparatus includes at least one processor (for example, a CPU), at least one network interface or another communications interface, a memory, and at least one communications bus, and is configured to implement connections and communication between components in the foregoing embodiments. The processor is configured to execute an executable module stored in the memory, to implement functions of all components in a control module in the foregoing embodiments. The memory may include a high-speed random access memory (RAM), and may also include a non-volatile memory (non-volatile memory), such as at least one magnetic disk memory. By using the at least one network interface (which may be wired or wireless), communication and a connection that are between the control module and at least one another network element are implemented, where the Internet, a wide area network, a local area network, a metropolitan area network, and the like may be used.

In some implementation manners, a program instruction is stored in a computer readable medium and includes a computer execution instruction, so that when a processor of a computer executes the computer execution instruction, the computer executes an encryption and decryption method in a virtualization system in any one of the foregoing embodiments. The program instruction may include each component specified in the foregoing embodiments of the present invention. For a specific implementation manner of each component, reference may be made to related content in the foregoing embodiments of the present invention. Details not described herein again.

It should be noted that the embodiments in this specification are all described in a progressive manner, for same or similar parts in the embodiments, reference may be made to these embodiments, and each embodiment focuses on a difference from other embodiments. Especially, device and system embodiments are basically similar to a method embodiment, and therefore are described briefly; for related parts, reference may be made to partial descriptions in the method embodiment. The described device and system embodiments are merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present invention without creative efforts.

In short, the foregoing descriptions are merely exemplary embodiments of the present invention, but are not intended to limit the protection scope of the present invention. Any modification, equivalent replacement, or improvement made without departing from the spirit and principle of the present invention shall fall within the protection scope of the present invention.

What is claimed is:

1. An encryption and decryption method performed by a computer, comprising:
   instantiating a user virtual machine and an encryption and decryption virtual machine on the computer;
   acquiring a first association relationship between a hard disk image identifier of the user virtual machine running on the computer and a key, and a second association relationship between the hard disk image identifier and a hard disk image attribute, the key comprises an encryption key;
   acquiring to-be-written data of the user virtual machine;
   determining, according to the second relationship, an attribute of a hard disk image into which the data is to be written is encryption;
   sending the identifier of the hard disk image to instruct the encryption and decryption virtual machine to encrypt the to-be-written data by using the encryption key according to the identifier of the hard disk image and the first relationship;
   writing the encrypted data into the hard disk image into which the data is to be written.

2. The method according to claim 1, wherein the first association relationship further comprises an identifier of the user virtual machine, the key further comprises a decryption key, the method further comprising:
   acquiring a read request from the user virtual machine;
   reading data from a hard disk image of the user virtual machine;
   acquiring the identifier of the user virtual machine, the read data, and an identifier of the hard disk image when the read data is encrypted data;
   sending the identifier of the user virtual machine, the read data, and the identifier of the hard disk image to instruct the encryption and decryption virtual machine to decrypt the read date by using the decryption key according to the first association relationship;
   returning the decrypted data to the user virtual machine.

3. The method according to claim 1, further comprising:
receiving a virtual machine start indication message, wherein the virtual machine start indication message carries an identifier of a started user virtual machine, a hard disk image identifier and a hard disk image attribute of the started user virtual machine; and
recording the hard disk image identifier and the hard disk image attribute that are of the started user virtual machine, and updating the second association relationship.

4. A computer, comprising:
a processor; and
a memory coupled to the processor and having a plurality of instructions stored thereon, the processor executing instructions of a VMM program running on the computer to:
acquire to-be-written data of a user virtual machine running on the computer;
determine, according to a second association relationship between a hard disk image identifier and a hard disk image attribute, an attribute of a hard disk image that is of the user virtual machine and into which the data is to be written;
the processor executing instructions of an encryption and decryption virtual machine program running on the computer to:
acquire the identifier of the hard disk image into which the data is to be written and the to-be-written data;
encrypt the to-be-written data by using the encryption key according to the acquired identifier and the first relationship;
the processor executing instructions of the VMM program to perform operations further comprising:
write the encrypted data into the hard disk image into which the data is to be written.

5. The computer according to claim 4, wherein the first association relationship further comprises an identifier of the user virtual machine, the key further comprises a decryption key,
the processor executing instructions of the VMM program to:
acquire a read request from the user virtual machine;
read data from a hard disk image of the user virtual machine;
the processor executing instructions of the encryption and decryption virtual machine program to:
acquire the identifier of the user virtual machine, the read data, and an identifier of the hard disk image when the read data is encrypted data;
decrypt the encrypted data by using the decryption key that is determined according to the first association relationship and that is corresponding to the identifier of the hard disk image;
the processor executing instructions of the VMM program to:
return the decrypted data to the user virtual machine.

6. The computer according to claim 5, wherein the processor is further configured to:
return the read data to the user virtual machine when the read data is non-encrypted data.

7. The computer according to claim 4, wherein the processor executing instructions of the VMM program to:
receive a virtual machine start indication message, wherein the virtual machine start indication message carries an identifier of a started user virtual machine, and a hard disk image identifier and a hard disk image attribute of the started user virtual machine; and
record the hard disk image identifier and the hard disk image attribute that are of the started user virtual machine, and updating the second association relationship.

8. The computer according to claim 4, wherein the processor executing instructions of the VMM program to:
acquire, from a device driver of the computer, a write request triggered by the user virtual machine, wherein the write request carries the to-be-written data.

* * * * *

UNITED STATES PATENT AND TRADEMARK OFFICE
CERTIFICATE OF CORRECTION

PATENT NO. : 9,959,410 B2
APPLICATION NO. : 15/637091
DATED : May 1, 2018
INVENTOR(S) : Wei He et al.

Page 1 of 1

It is certified that error appears in the above-identified patent and that said Letters Patent is hereby corrected as shown below:

In the Claims

In Column 26, on Line 65: Claim 1, delete "decrypt the read date" and insert --decrypt the read data--.

Signed and Sealed this
Twenty-fifth Day of June, 2019

Andrei Iancu
*Director of the United States Patent and Trademark Office*